(12) United States Patent
Van Den Oetelaar et al.

(10) Patent No.: US 8,477,578 B2
(45) Date of Patent: Jul. 2, 2013

(54) MULTI-SPEED RECORDING FOR MULTI-LAYER DISC

(75) Inventors: Ronald Van Den Oetelaar, Eindhoven (NL); Hubert Cecile Francois Martens, Eindhoven (NL); Wilhelmus Robert Koppers, Eindhoven (NL); Pierre Hermanus, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/017,234

(22) Filed: Jan. 31, 2011

(65) Prior Publication Data
US 2011/0128841 A1    Jun. 2, 2011

Related U.S. Application Data

(63) Continuation of application No. 11/569,075, filed as application No. PCT/IB2005/051516 on May 10, 2005, now Pat. No. 7,903,512.

(51) Int. Cl.
*G11B 7/00* (2006.01)

(52) U.S. Cl.
USPC ............ 369/47.52; 369/47.38; 369/94

(58) Field of Classification Search
USPC .............. 369/47.38, 47.52, 94, 283
See application file for complete search history.

(56) References Cited

U.S. PATENT DOCUMENTS
2005/0013216 A1    1/2005   Kim et al.

FOREIGN PATENT DOCUMENTS
WO    03105139 A1    12/2003

*Primary Examiner* — Wayne Young
*Assistant Examiner* — Brenda Bernardi

(57) ABSTRACT

The present invention relates to a recording apparatus, record carrier and method of recording data on at least two layers of a recording medium by using a radiation power, wherein individual recording speeds are determined for respective ones of the at least two layers at different values of the radiation power. A recording speed to be used for recording on an individual one of the at least two recording layers is selected based on a maximum radiation power specified for the recording operation, and the speed of the recording operation is controlled individually for each of the at least two layers based on the selected recording speed. The determination of the individual recording speeds at different radiation power values may be written or embossed on the record carrier. Furthermore, a recording sequence used for recording on the recording layers can be set based on the sensitivities and thus recording speeds. Thereby, total recording time can be minimized for multi-layer recording media.

6 Claims, 2 Drawing Sheets

MULTI-SPEED RECORDING FOR MULTI-LAYER DISC

This is a continuation of prior application Ser. No. 11/569,075, now U.S. Pat. No. 7,903,512, filed Nov. 14, 2006 which is a National Stage of International Application PCT/IB2005/051516 filed May 10, 2005, which claimed foreign priority benefit of EP application EP04102146 filed May 17, 2004 and which are all incorporated herein in whole by reference.

The present invention relates to a recording apparatus and power control method of controlling a radiation power used for recording data on a recording medium, and to a record carrier to which information can be written using the recording apparatus and power control method.

Optically recordable record carriers or information carriers are generally known and are used in recording apparatuses which record data on the information carrier by means of a radiation beam, e.g., a laser beam. The radiation beam is focused onto a recording layer in the information carrier. In the case of an adequate radiation beam intensity or radiation power, the optical properties of the recording layer at the location of the focal spot will change, as a result of which a mark is produced in the recording layer. By varying the radiation beam intensity, a pattern of marks can be formed in the recording layer. The recorded pattern contains the data to be recorded in coded form. Examples of such an optically recordable information carrier are the CD-R (Compact Disc Recordable) or CD-RW (Compact Disc Rewritable) or the DVD-R (Digital Versatile Disc Recordable) or the related DVD+R.

In order to extend the storage capacity of optically recordable information carriers, information carriers have been introduced which comprise a plurality of superposed recording layers. The recording layers of such multi-layer information carriers can be of a read-only and/or recordable (i.e. write-once) and/or rewritable type. Each recording layer in a multi-layer optically recordable information carrier can be inscribed separately by focusing the radiation beam onto the relevant recording layer. The recording apparatuses use a high Numerical Aperture (NA). Owing to this high NA, the diameter of the radiation beam at the location of the recording layers situated between the source of the radiation beam (e.g., laser light source) and the recording layer to be inscribed (intermediate layers) is comparatively large. As a result of this, the intensity of the laser beam at the location of the intermediate layers will be inadequate intensity to produce marks on these layers, whereas producing marks on the recording layer to be inscribed is possible. Also, at the location of each of the recording layers having a distance between the respective layer and the radiation source which is larger than the distance between the recording layer to be inscribed and the radiation source, the intensity of the radiation beam is inadequate to produce marks in these layers owing to the comparatively large diameter of the beam.

However, although the intermediate layers cannot be inscribed, they have influence on the radiation beam. A part of the radiation beam will be reflected, diffused, and absorbed by the intermediate layers. The remainder of the radiation beam, quantified by the transmission coefficient, will be transmitted by the intermediate layers. The magnitude of the transmitted part depends on the optical properties of the intermediate layers. However, these optical properties change when these layers are inscribed. The intensity of the radiation beam should thus be so high that in all cases each recording layer in the multi-layer optically recordable information carrier can be inscribed.

Typically, the required radiation power to inscribe or record data on a recordable or rewritable layer in a multi-layer medium will be larger than the required power in a single-layer medium. The top layer(s) have to be semi-transparent and become less sensitive due to a lower absorption of the radiation beam. The bottom layer(s) are shielded by the top layer(s) and therefore require a higher radiation power.

A recording apparatus such as an optical storage drive has a maximum laser power. If, at a given recording speed, the sensitivity of a recordable or rewritable recording layer is such that it requires more than the maximum laser power, data can only be recorded at a lower speed. Consequently, the total time required to record a multi-layer medium, containing n recordable and/or rewritable layers, may be more than n times the total recording time of a single-layer medium. Therefore, it is important to develop a recording scheme which minimizes the total recording time.

It is an object of the present invention to provide an improved recording scheme by means of which recording time of multi-layer recording media can be reduced.

This object is achieved by a recording apparatus as claimed in claim 1, by a recording method as claimed in claim 7, and by a record carrier as claimed in claim 9.

Accordingly, recording time can be reduced by selecting and setting specific recording speeds for individual recording layers based on the determined individual recording speeds for each recording layer. The top layers which require less radiation power can thus be recorded at a higher recording speed due to the lower radiation power required for recording.

The determination means may be arranged to derive the individual recording speeds from a control information read from the recording medium. The individual recording speeds may be derived directly from the control information, e.g. based on discrete number(s) or the like. Alternatively, the individual recording speeds may be derived based on an interpolation or extrapolation of the control information, e.g., an interpolation or extrapolation of discrete numbers stored on the recording medium, to thereby provide a better adaptation of the selected recording speed. In particular, the control information may be pre-stored in a pre-groove of the recording medium. Thereby, the individual recording speeds and their related writing powers can be directly read from the recording medium without requiring dedicated look-up tables or other memory means for storing the control information of each possible type of multi-layer recording medium.

Furthermore, the selection means may be arranged to select the highest allowable recording speed for each individual one of the at least two recording layers. This leads to an optimization of recording speeds of each individual recording layer to achieve a minimized recording time.

The speed control means can be arranged to perform recording at a selected higher speed in a first layer of the at least two layers, and to perform recording at a selected lower speed on a second layer of the at least two recording layers. The first layer may be a top layer and the second layer may be a bottom layer of the recording medium, or vice versa.

In general, the speed control means may be arranged to determine a recording sequence of the at least two layers based on determined sensitivities of the at least two layers. The sensitivities may be determined on the basis of the selected recording speeds or, alternatively, by the determination means from a control information read from the recording medium. Such a determination of the recording sequence based on the layer sensitivities is particularly advantageous for multi-layer recording media with three or more recording layers, as it leads to an increased overall recording speed.

The present invention will now be described on the basis of preferred embodiments with reference to the accompanying drawings, in which.

In the following the preferred embodiments will be described with respect to an optical drive or optical disc recorder for a multi-speed and multi-layer recordable and/or rewritable optical storage medium, such as a multi-layer disc selected from the group of optical discs consisting of dual-layer DVD+R, dual-layer DVD+RW, dual-layer DVD-R and dual-layer DVD-RW.

The DVD+R/+RW format is becoming increasingly popular for digital video recording as well as for all PC (Personal Computer) data storage applications. A key advantage of the DVD+R/+RW format over competitive formats is its backward compatibility with DVD read-only systems, allowing playback in existing DVD players. Such write-once discs are provided with guides called pregrooves. The pregroove wobbles slightly in a radial direction of the disc around a central frequency, wherein information such as a recording time address information called ATIP (Absolute Time In Pregroove) or a recording address information called ADIP (Address In Pregroove) are recorded with an FSK (Frequency Shift Keying) modulation.

Figure 1:
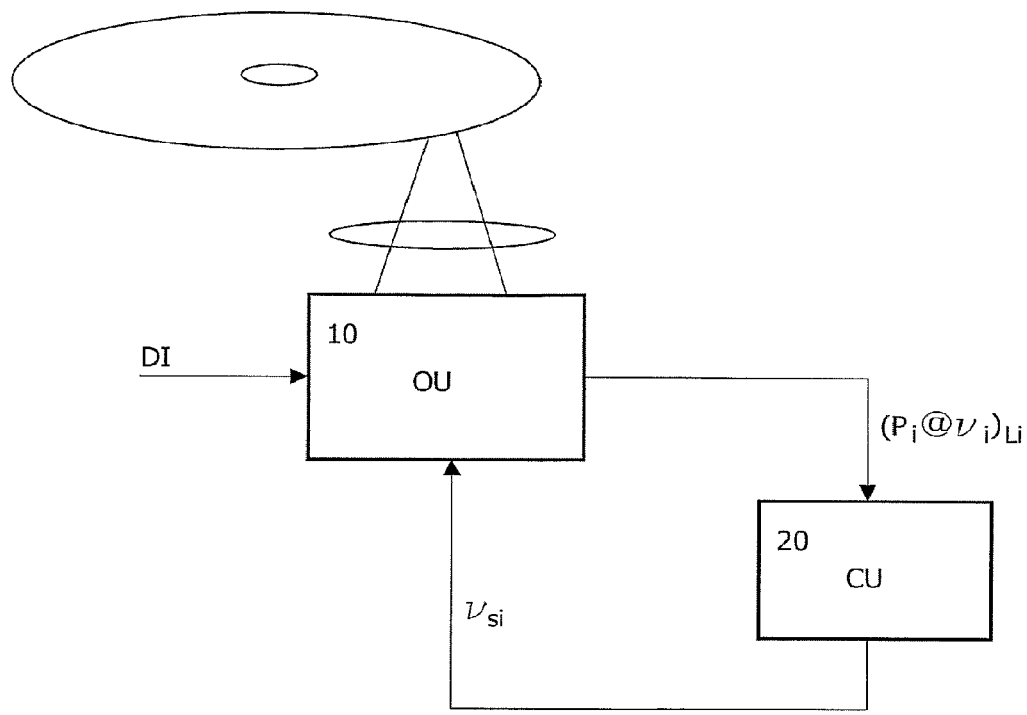
FIG. 1 shows a schematic block diagram of a recording apparatus according to the preferred embodiments.

FIG. 1 shows a schematic block diagram of an optical disc recorder according to the preferred embodiments. In FIG. 1, input data DI is supplied to an optical unit 10 in order to be recorded or written to the optical disc. On the optical disc, i.e. the DVD+R disc, a thin organic dye film is provided as a data storage layer. As already mentioned, the recording principle is based on irreversibly modifying properties of the recording layer to be inscribed. The digital information is contained in the length of the recorded marks and unmodified spaces between them. Furthermore, a control unit 20 which may be any kind of processor circuit is provided which controls the optical unit 10 in a manner so as to set individually selected recording speeds $v_{si}$ for each recording layer $L_i$, wherein i=0 to n−1 and denotes a specific one of n recording layers provided in the multi-layer optical disc. In case of a dual-layer optical disc, two recording layers L0 and L1 are provided and thus n=2.

It is to be noted here that the block diagram of FIG. 1 only shows those parts of the recording apparatus which are involved in the power control procedure of the present invention, while other components which might be necessary for performing the recording operation have been omitted for reasons of simplicity.

According to FIG. 1, the optical unit 10 is arranged to read and supply, e.g. among other disc parameters, a control information stored, recorded, embossed, or in another way written on the optical disc and indicating write strategy parameters including a set of individual recording speeds $v_i$ for each recording layer $L_i$ and their associated or related writing laser powers $P_i$. As an example, the control information which indicates the different write strategy parameters at different recording speeds can be stored as e.g. ADIP information on the dual-layer DVD+R disc.

According to the first preferred embodiment, the control unit 20 determines and optionally stores the set of individual recording speeds $v_i$ for each recording layer $L_i$ and their associated or related writing laser powers $P_i$. Based on this information, the control unit 20 can determine the highest recording speed for each of the recording layers, taken into account the maximum laser power of the optical recorder. The control unit 20 may store the determined set of individual recording speeds $v_i$ for each recording layer $L_i$ and their associated or related writing laser powers $P_i$. The control unit 20 then starts recording in the most sensitive recording layer at the highest speed possible, taken into account the maximum laser power of the optical drive which may be stored at a corresponding storing facility of the disc recorder. Typically, this recording layer will be the top recording layer $L_0$ facing the optical unit 10. Once this top recording layer $L_0$ has been fully recorded, the control unit 20 performs control so as to continue recording on the next most sensitive recording layer at the highest speed possible, i.e., the bottom layer $L_1$. In case of a multi-layer disc with more than two recording layers, the recording scheme will continue in the same manner by continuing recording on the next most sensitive recording layer at the highest speed possible, and so on.

Hence, instead of determining an "overall recording speed" for the entire optical disc based on the maximum speed of the "slowest layer", the top recording layer $L_0$ may be recorded at a higher speed than the bottom recording layer $L_1$. In this way, half of the storage capacity of the dual-layer disc may be recorded at a higher speed than the "overall recording speed". In practice, more than half of the storage capacity can be recorded at a higher speed, since most often only part of the slowest layer, i.e. the bottom layer (L1), will be used. Clearly, the proposed multi-speed recording scheme can reduce the total time required to record a multi-layer optical storage medium compared to a single-speed "overall" recording scheme.

Figure 2:
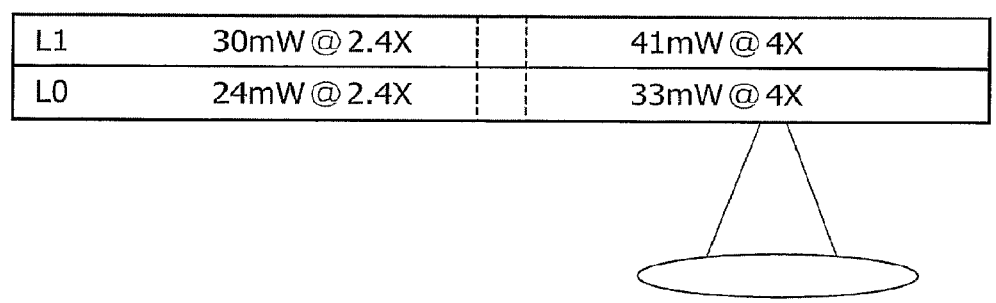
FIG. 2 shows a schematic side view of a record carrier according to the preferred embodiments with an indication of the control information provided thereon.

FIG. 2 shows a specific example of a dual-layer DVD+R disc with specific write strategy parameters for different laser powers. The corresponding dual-layer DVD+R optical drive or optical recorder has a specific maximum laser power of 35 mW. According to the control information provided on the dual-layer DVD+R disc, e.g., as an ADIP information, laser power values are specified for each recording layer for recording at an indicated speed. The top recording layer $L_0$ can be recorded at a relative speed of 2.4× if the laser power is at least set to a value of 24 mW. Additionally, the top recording layer $L_0$ can be recorded at a higher relative speed of 4× if the laser power is at least set to a value of 33 mW. On the other hand, the bottom recording layer $L_1$ can be recorded at a relative speed of 2.4× if the laser power is at least set to a value of 30 mW. Additionally, the bottom recording layer $L_1$ can be recorded at a higher relative speed of 4× if the laser power is at least set to a value of 41 mW.

Consequently, in the specific case of recording on the optical disc specified in FIG. 2 and using a disc recorder with a maximum laser power of 35 mW, the control unit 20 will apply a recording scheme in which recording starts on the top recording layer $L_0$ at 4× recording speed. Once this top recording layer $L_0$ has been fully recorded, the control unit 20 controls the optical unit 10 so as to continue recording on the bottom layer $L_1$ at the lower 2.4× recording speed due to the fact that a laser power of 41 mW required for recording at the higher speed is not available.

Figure 3:
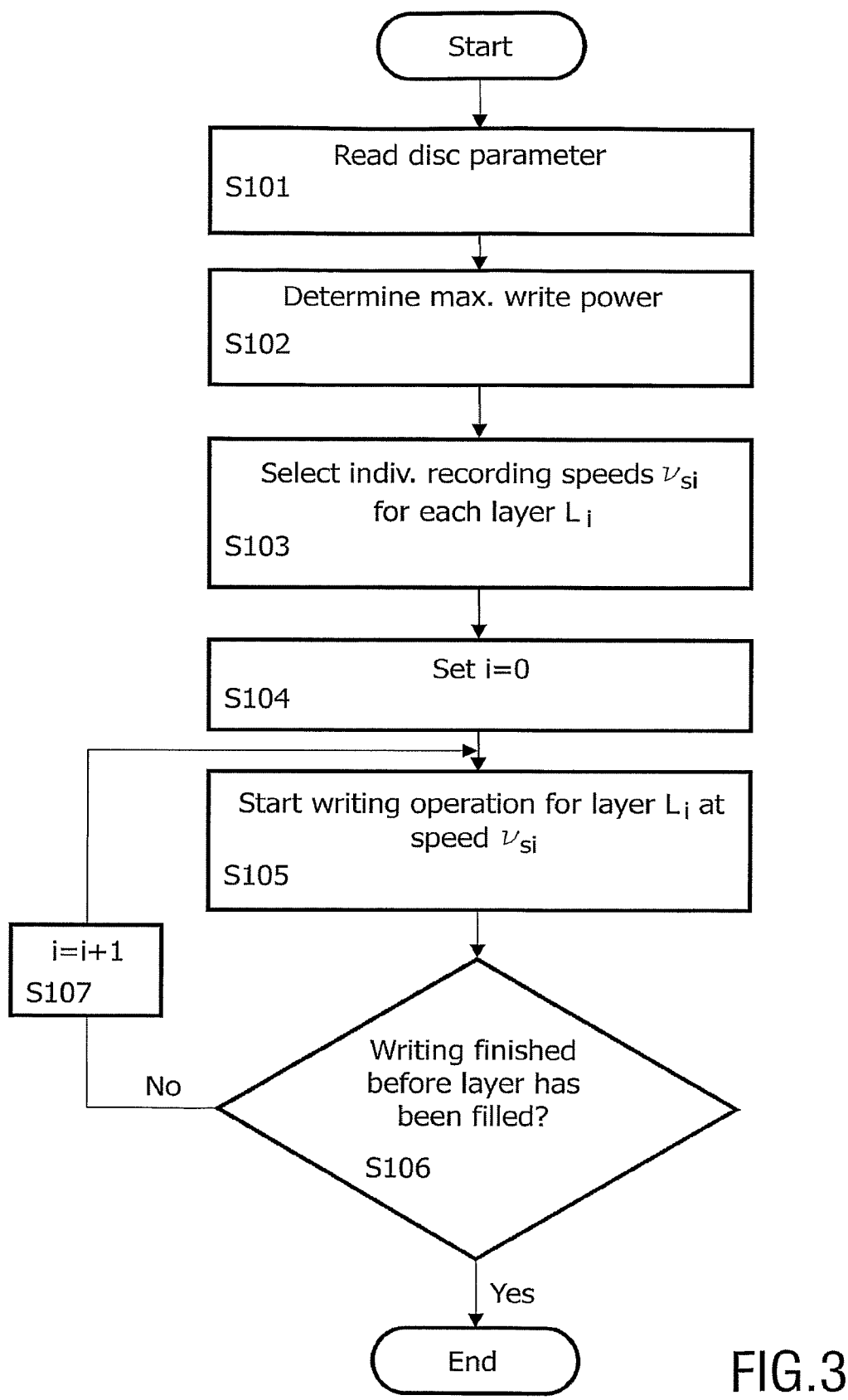
FIG. 3 shows a schematic flow diagram of a recording method according to the first preferred embodiment.

FIG. 3 shows a schematic flow diagram of a recording or writing procedure or mechanism according to the first preferred embodiment.

In step S101, the optical unit 10 initially reads control information including disc parameters stored on the optical disc, e.g., as an ADIP information, and supplies the control information to the control unit 20. Then, in step S102, the control unit 20 determines the maximum write power specified for the disc recorder, and subsequently selects in step S103 individual recording speeds $v_{si}$ for each of the recording layers $L_0$ and $L_1$ based on the determined maximum write power. In step S104 a running parameter i is set to zero, to be able to know the position or number of the currently recorded or inscribed recording layer. Following this, in step S105, the control unit 20 starts the writing operation for the top recording layer $L_0$ at the recording speed $v_{s0}$ selected for the top recording layer $L_0$. In step S106, it is checked whether writing has been finished before the top recording layer $L_0$ has been filled. If not, i.e. if there is still data left for writing to the next layer, the running parameter i is incremented in step S107 and the procedure returns to step S105 in order to continue the writing operation on the subsequent layer $L_1$ at the recording speed $v_{s1}$ selected for this subsequent layer $L_1$. On the other hand, if it is determined in step S106 that writing has been finished before the end of the current recording layer, the writing procedure ends.

In the above first preferred embodiment, the top recording layer $L_0$ is suggested to be fully recorded, e.g. at the highest speed, before any recording on the subsequent layer $L_1$ is started. However, as an alternative solution according to a modification of the preferred embodiment which is specifically relevant for optical discs according to the dual-layer DVD-ROM standard, it could be desirable to have an equal amount of data present on each of the two layers. That is, recording on the subsequent recording layer $L_1$ of a dual-layer disc could already start once half of the data has been written to the top recording layer $L_0$.

Furthermore, as another modification of the first preferred embodiment, a more optimum or better adapted recording speed, which corresponds to a recording power even closer to the maximum write power, may be obtained or selected in the selection step S103 of FIG. 3 by interpolation or extrapolation of discrete numbers or values stored in the pre-groove. Of course, other estimation procedures can be used for deriving the selected recording speed from the stored numbers or values.

In the foregoing, it has been assumed that the top layer is the most sensitive layer, which can be recorded at a higher speed than the bottom layer. However, there may be recording media or record carriers, where the opposite is true, i.e. the bottom layer is more sensitive than the top layer. In such cases, the bottom recording layer will be recorded at a higher recording speed, while the top recording layer is recorded at a relatively lower recording speed.

According to a second preferred embodiment, the recording sequence or order of the recording layers is determined based on the sensitivity of each layer and thus based on the associated maximum recording speed. This is specifically advantageous for recording media consisting of three or more recording layers, where the order of layer sensitivity not necessarily corresponds to the order of layers with respect to the optical unit 10. As an example which corresponds to the recording sequence of the first preferred embodiment, the recording layer with the highest sensitivity, which thus allows the highest recording speed, may be recorded first, followed by the recording layer with the second highest sensitivity, and so on. Of course, other sequences could be implemented based on desired characteristics of the application.

The general structure of the optical disc recorder according to the second preferred embodiment is similar to the first preferred embodiment as depicted in FIGS. 1 and 3. Therefore, a description of the identical parts is omitted here for reasons of brevity. However, the modification according to the second preferred embodiment requires an additional ordering step S103a in the flow diagram of FIG. 3, which can be introduced between steps S103 and S104. In the newly introduced step S103a, the original sequence of the recording layers Li as arranged on the disc is re-ordered based on the individual recording speeds selected in step S103. The re-ordered sensitivity-based sequence L1 to Ln of recording layers is then processed similar to the first preferred embodiment in the loop consisting of steps S106 and S107 of FIG. 3, wherein the control unit 20 is arranged to control the optical unit 10 in such a manner that recording is effected on the selected recording layer at the selected recording speed.

As an alternative, the individual sensitivities may be directly obtained from a control information written on the optical disc, as a disc parameters which can be read in step S101 of FIG. 3. In this case, the re-ordering in step 103a can be performed directly based on the read sensitivity parameters.

In summary, a recording apparatus and method is proposed for recording data on at least two layers of a recording medium by using a radiation power, wherein individual recording speeds are determined for respective ones of the at least two layers at different values of the radiation power. A recording speed to be used for recording on an individual one of the at least two recording layers is selected based on a maximum radiation power specified for the recording operation, and the speed of the recording operation is controlled individually for each of the at least two layers based on the selected recording speed. The determination of the individual recording speeds at different radiation power values may be written or embossed on a record carrier. Furthermore, the recording sequence used for recording on the recording layers may be set based on the sensitivities and thus recording speeds. Thereby, total recording time can be minimized for multi-layer recording media.

It is noted that the present invention is not restricted to the above preferred embodiment but can be used in any recording scheme so as to reduce the required recording time. In particular, the present invention is not restricted to optical disc media, but can be used for any recording media having the different writing properties for different recording layers, which require different radiation powers and related recording or writing speeds. Furthermore, any type of control information suitable for predicting or determining a required recording speed in relation to the radiation power can be stored on the recording media or at the recording apparatus. The preferred embodiments may thus vary within the scope of the attached claims.

The invention claimed is:

1. A recording apparatus comprising:
   means for reading a record carrier, said recording carrier having at least two recording layers (L0, L1) for recording data using a radiation power, said record carrier having written thereon a control information which indicates individual recording speeds to be used for respective ones of said at least two recording layers at different values of said radiation power;
   means for selecting a highest available recording speed and radiation power for a selected one of said at least two layers based on an available radiation power and said control information; and
   means for writing data to said selected one of said two employing said highest available recording speed and radiation power.

2. The apparatus according to claim 1, wherein said control information is pre-stored in a pre-groove of said record carrier.

3. The apparatus according to claim 1, wherein said record carrier is one selected from a group of optical discs consisting of: dual-layer DVD+R, dual-layer DVD+RW, dual-layer DVD-R and dual-layer DVD-RW.

4. An apparatus comprising:
means for receiving a record carrier having at least two recording layers (L0, L1) for recording data by using a radiation power, said record carrier having written thereon a control information which indicates individual recording speeds to be used for respective ones of said at least two recording layers at different values of said radiation power; and
a control unit configured to:
read said control information;
determine an individual recording speed and radiation power for selected ones of said at least two layers based on said control information;
adjust said determined individual recording speed and radiation power to be a highest available recording speed based on an available radiation power, and
write data to a selected one of said layers of said record carrier with said highest available recording speed.

5. An apparatus according to claim 4, wherein said control information is pre-stored in a pre-groove of said record carrier.

6. An apparatus according to claim 4, wherein said record carrier is one selected from a group of optical discs consisting of: DVD+R, DVD+RW, DVD-R and DVD-RW.

* * * * *